United States Patent

Ogino

[11] Patent Number: 4,560,253
[45] Date of Patent: Dec. 24, 1985

[54] ZOOM LENS SYSTEM
[75] Inventor: Shuji Ogino, Osaka, Japan
[73] Assignee: Minolta Camera Kabushiki Kaisha, Osaka, Japan
[21] Appl. No.: 538,987
[22] Filed: Oct. 4, 1983
[30] Foreign Application Priority Data
  Oct. 5, 1982 [JP] Japan .................. 57-175692
[51] Int. Cl.⁴ .................. G02B 13/18; G02B 15/14
[52] U.S. Cl. .................. 350/426; 350/432
[58] Field of Search .................. 350/432, 426, 433–435

[56] References Cited

U.S. PATENT DOCUMENTS

| 4,159,865 | 7/1979 | Kawamura et al. | 350/426 |
| 4,195,912 | 4/1980 | Doi et al. | 350/426 |
| 4,400,064 | 8/1983 | Ikemori et al. | 350/426 |
| 4,469,412 | 9/1984 | Tajima et al. | 350/426 |

FOREIGN PATENT DOCUMENTS

| 54-114236 | 9/1979 | Japan | 350/426 |
| 57-20173 | 2/1982 | Japan | |

Primary Examiner—John K. Corbin
Assistant Examiner—Scott J. Sugarman
Attorney, Agent, or Firm—Price, Gess & Ubell

[57] ABSTRACT

A two group zoom lens system of an inverted telephoto type is provided wherein a first lens group of a negative refractive power consisted of a first negative component and a second positive component of a positive meniscus lens convex to the object side; and a second lens group of a positive refractive power located with a variable air space between the first and second lens groups, consisting of third and fourth positive components, a fifth negative component, and a sixth positive component; wherein the shortest focal length of the whole lens system is less than the length of the diagonal line of the image plane; and wherein the lens system fulfills the following conditions;

$$2.3\ fs < l < 2.75\ fs$$

$$0.55\ fs < \gamma_3 < 1.8\ fs$$

wherein,
$fs$ represents the shortest focal length of the whole lens system,
$l$ represents the axial distance between the object side surface of the first component and the image plane, and
$\gamma_3$ represents the radius of curvature of the object side surface of the second component.

9 Claims, 8 Drawing Figures

ZOOM LENS SYSTEM

BACKGROUND OF THE INVENTION

1. Field of the Invention

The present invention relates to a zoom lens system, and more particularly to a two group zoom lens system in which an air space, formed between the two groups, is varied in a zooming operation.

2. Description of the Prior Art

In this field of art, it is well known to provide a two group zoom lens system which has a first negative lens group at the front of the zoom lens system and a second positive lens group located at the image side of the first lens group with a variable air space formed between the first and second lens groups. In this zoom lens system, the first and second lens groups are shiftable along the optical axis with the variable air space changing during a zooming operation, and the first lens group alone is shiftable along the optical axis in a focusing operation. Such a zoom lens system is of an inverted telephoto type because of the negative front lens group, and is a favorable format for designing a wide angle lens system.

Therefore, various designs of such zoom lens system have been provided. For example, U.S. Pat. No. 4,159,865 has disclosed a two group zoom lens system of an inverted telephoto type comprising a first negative lens group consisting of four or five lens components and a second positive lens group consisting of six or seven lens components. The second positive lens group is located at the image side of the first lens group with a variable air space formed between the first and second lens groups, said variable air space being varied during a zooming operation. However, since the zoom lens system disclosed in the U.S. patent requires ten or eleven lens components as described above, it is complex in construction, expensive, and has a considerable length along its optical axis.

To improve this type of lens system, the inventor of the present invention has suggested an inverted telephoto type two group zoom lens system consisting of six lens components in Japanese Laid-Open Patent No. SHO 54-114236. The first embodiment of the Japanese Patent has disclosed a two group zoom lens system comprising, from the object side to the image side, a first negative lens group consisting of a first negative component with a stronger image side surface concave to the image side, and a second positive component of a positive meniscus lens convex to the object side, and a second positive lens group consisting of third and fourth positive components, a fifth negative component and a sixth positive component.

The present invention relates to an improvement of the two group zoom lens system disclosed in the above-mentioned Japanese patent.

SUMMARY OF THE INVENTION

An object of the present invention is to provide an inverted telephoto type two group zoom lens system consisting of six components, and in which various aberrations are further corrected to a high degree.

Another object of the present invention is to provide an inverted telephoto type two group zoom lens system in which various changes in various aberrations during the zooming operation are sufficiently controlled, and in which compactness of the zoom lens system is ameliorated.

According to the present invention, the zoom lens system comprises, from the object side to the image side, a first lens group of a negative refractive power consisting of a first negative component, and a second positive component of a positive meniscus lens convex to the object side, at least one of the refractive surfaces in the first lens group being aspheric, and a second lens group of a positive refractive power located with a variable air space formed between the first and second lens group, consisting of third and fourth positive components, a fifth negative component, and a sixth positive component, the variable air space being varied during a zooming operation, wherein the shortest focal length of the whole lens system is less than the length of the diagonal line of the image plane, and wherein the zoom lens system fulfills the following conditions:

$$2.3 f_s < l < 2.75 f_s$$

$$0.55 f_s < \gamma_3 < 1.8 f_s$$

wherein:

$l$ represents the axial distance from the object side surface of the first component to the image plane of the whole lens system in the longest focal length condition;

$\gamma_3$ represents the radius of curvature of the object side surface of the second component; and $f_s$ represents the focal length, of the whole lens system in the shortest focal length condition.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DETAILED DESCRIPTION OF THE PREFERRED EMBODIMENTS

Figure 1:
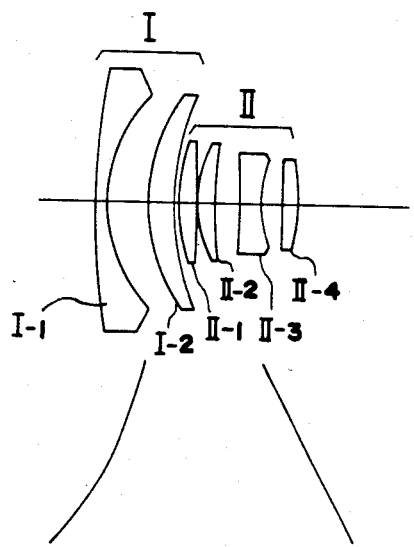
FIG. 1 represents a cross-sectional schematic view of the embodiment 1 according to an present invention.

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zoom lens system. The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens group and lens elements for the longest focal length with lines below the lens groups representing the directions of their movements for zooming toward the shortest focal length. It was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 3:
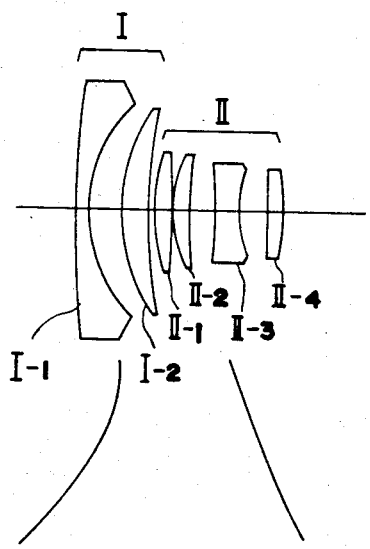
FIG. 3 represents a cross-sectional schematic view of an embodiment 2 according to the present invention.
Figure 2A:
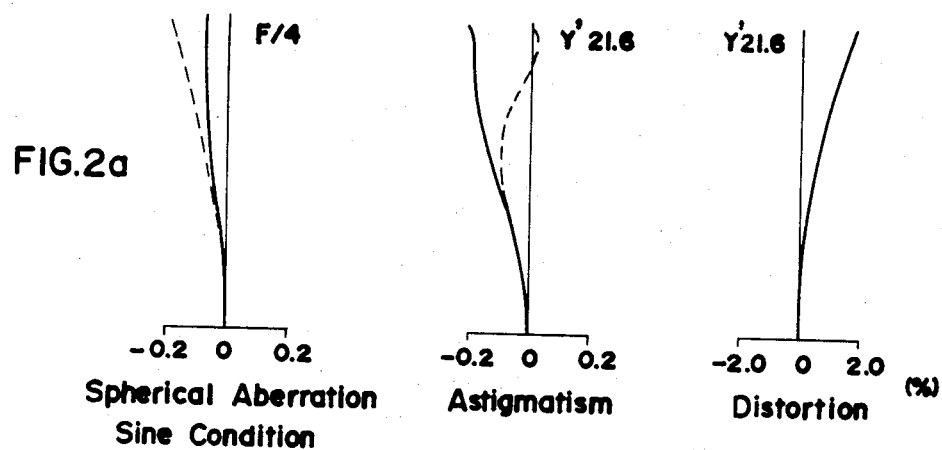
FIG. 2a represents graphic plots of the various aberrations in the longest focal length condition of the embodiment 1.
Figure 2B:
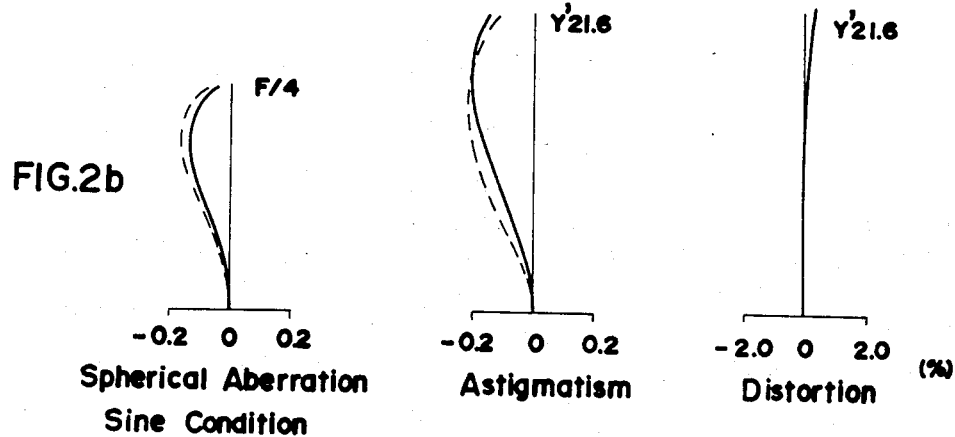
FIG. 2b represents graphic plots of the various aberrations in the middle focal length condition of the embodiment 1.
Figure 2C:
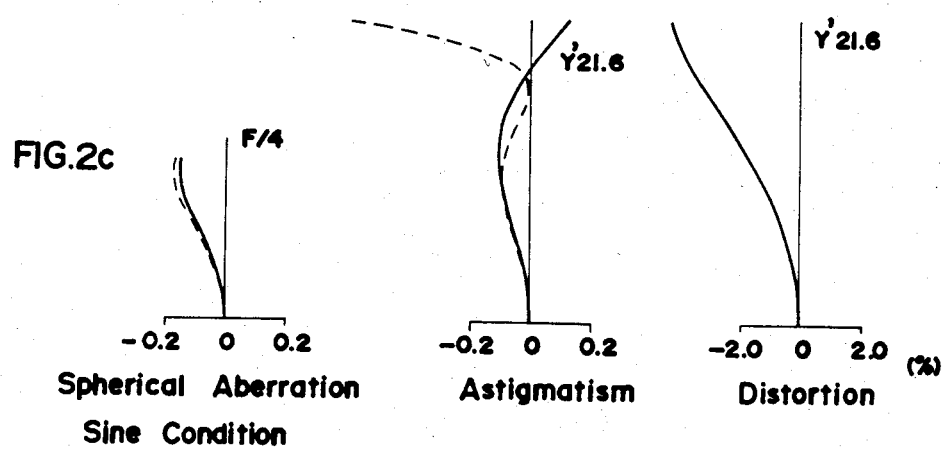
FIG. 2c represents graphic plots of the various aberrations in the shortest focal length condition of the embodiment 1.
Figure 4A:
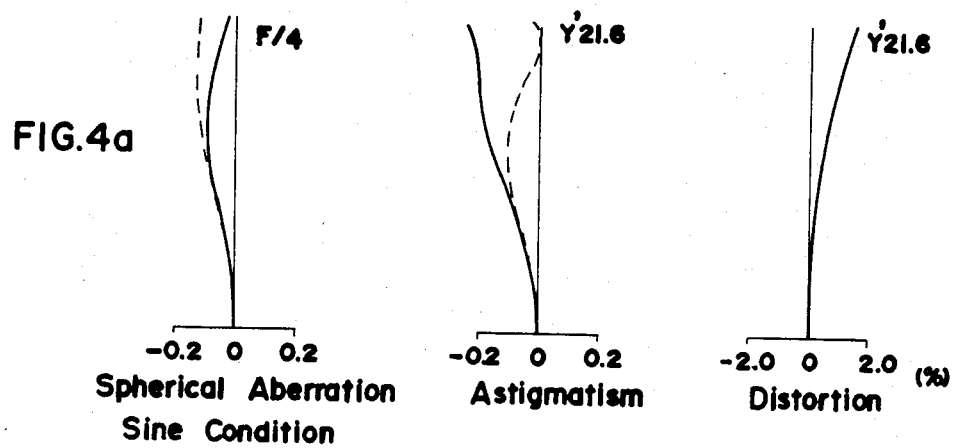
FIG. 4a represents graphic plots of the various aberrations in the longest focal length condition of the embodiment 2.
Figure 4B:
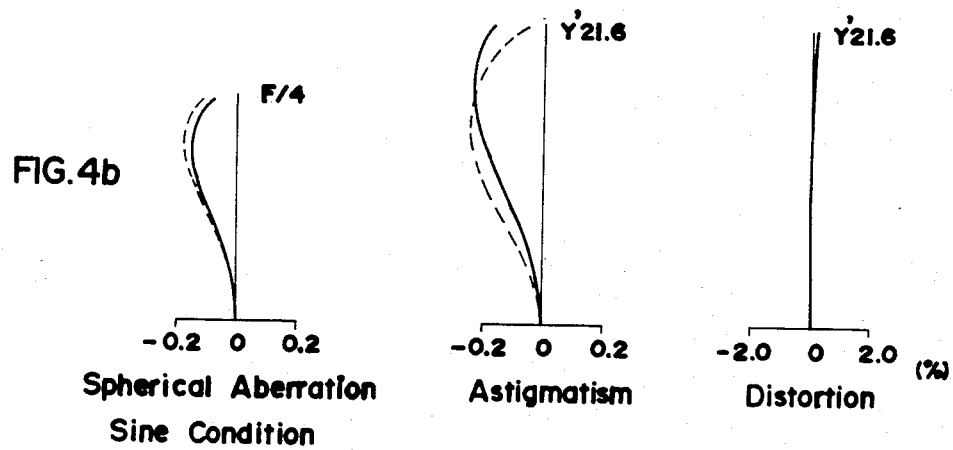
FIG. 4b represents graphic plots of the various aberrations in the middle focal length condition of the embodiment 2.
Figure 4C:
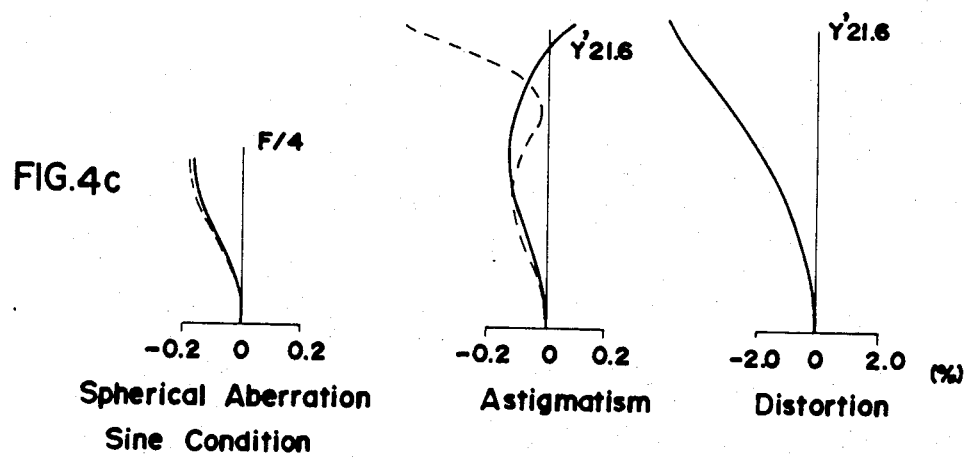
FIG. 4c represents graphic plots of the various aberrations in the shortest focal length condition of the embodiment 2.

As is apparent from FIGS. 1 and 3, the present invention provides a two group zoom lens system of an inverted telephoto type comprising, from the object side to the image side, a first lens group (I) of a negative refractive power consisting of a first negative component (I-1) the absolute value of the radius of curvature of the image side surface on the first component being less than that of the object side surface, a second positive component (I-2) of a positive meniscus lens convex to the object side, at least one of the refractive surfaces in the first lens group being aspheric; a second lens group (II) of a positive refractive power located with a variable air space formed between the first and second lens groups, consisting of a third positive component (II-1), a fourth positive component (II-2), a fifth negative component (II-3), the absolute value of the radius of curvature of the image side surface on the fifth component being less than that of the object side surface, and a sixth positive component (II-4), the absolute value of the radius of curvature of the image side surface on the sixth component being less than that of the object side surface, said variable air space being varied during a zooming operation as shown in lines in the FIGS. 1 and 3. The zoom lens system according to the present invention is characterized by the shortest focal length of the whole lens system which is defined to be less than the length of the diagonal line of the image plane, and fulfills the following conditions:

$$2.3 f_s < l < 2.75 f_s \quad (1)$$

$$0.55 f_s < \gamma_3 < 1.8 f_s \quad (2)$$

wherein, $l$ represents the axial distance from the object side surface of the first component (I-1) to the image plane of the zoom lens system in the longest focal length condition, $\gamma_3$ represents the radius of curvature of the object side surface of the second component (I-2), and fs represents the focal length of the whole lens system in the shortest focal length condition.

With respect to the conditions of the present invention, condition (1) is for defining the axial distance from the object side surface of the first component (I-1) to the image plane of the whole lens system, relative to the focal length of the whole lens system in the shortest focal length condition. If the lower limit of condition (1) is violated, it becomes difficult to sufficiently correct various aberrations. Especially, the negative distortion in the wide angle condition and the negative field curvature in the middle focal length condition since they are greatly enhanced. If the upper limit of condition (1) is violated, the desired compactness of the whole lens system is not achieved, because the total length of the whole lens system becomes too long.

Condition (2) is for defining the radius of curvature of the object side surface of the second component (I-2) relative to the focal length of the whole lens system in the shortest focal length condition. It is effective for controlling various changes in spherical aberration, astigmatism, coma, and distortion during the zooming operation. If the lower limit of condition (2) is violated, the spherical aberration of the higher order and the coma are greatly generated in the long focal length side, and the negative distortion is increased in the short focal length side. If the upper limit of condition (2) is violated, the positive spherical aberration is greatly generated in the long focal length side, and it becomes difficult to sufficiently correct the astigmatism in the middle focal length condition.

Next, according to the present invention, an aspherical surface has been applied to at least one of the refractive surfaces in the first lens group. If all of the refractive surfaces in the inverted telephoto type two group zoom lens system consisting of six lens components are spherical as the above Japanese Patent, the negative distortion and the position astigmatism in the peripheral area of the image are greatly enhanced on the wide angle side. Therefore, according to the present invention, the aspheric surface is introduced to at least one of the refractive surfaces in the first lens group for sufficiently correcting the above negative distortion and the above astigmatism. Namely, the light pencil for forming a peripheral area of the image passes through a portion of the first group apart from the optical axis in the wide angle condition, and is effectively improved by the aspheric surface.

Furthermore, among the four refractive surfaces in the first lens group, the object side surface of the first component (I-1) or the image side surface of the second component (I-2) is especially favorable to have an aspheric surface. Namely, since the light pencil is refracted with relatively small angle on the above mentioned two surfaces, the sufficient corrections of the distortion and the astigmatism in the wide angle side are achieved without deteriorating other aberrations by applying the aspheric surface to at least one of such two surfaces. Additionally, in the present invention, since the aspheric surface is applied to the surface on which the light pencil is refracted with relatively small angles, it can be considered that any slight error in manufacturing a desired aspheric surface configuration scarcely influences various aberrations. Therefore, severe accuracy would not be required for manufacturing a predetermined aspheric surface configuration. It is accordingly favorable for actually manufacturing the lens system.

According to the present invention, a favorable method for manufacturing the aspheric surface is provided as follows. The desired aspheric surface configuration is manufactured by depositing a thin transparent layer on a spherical surface, and forming the surface of the thin transparent layer facing to the air into the desired aspheric surface configuration. In this method, it is possible to control chromatic aberration of the whole lens system by utilizing the difference in dispersion between a material of which the spherical surface is made and the thin transparent layer. For example, in the case of the embodiment 2 described below, the aspheric surface is applied to the image side surface of the second component (I-2) to form a composite lens element. In this case, since the glass which forms the spherical surface has a high dispersion characteristic, it is possible to decrease the difference in coma in the wide angle side according to the wavelength by means of applying a material whose dispersion is lower than that of the glass to the thin transparent layer.

Tables 1 and 2 represent the embodiment 1 and 2 of the present invention, respectively. The asterisk (*) in the tables indicates the aspheric surface. For examples, the object side surface of the first component (I-1) is the aspheric surface in case of the embodiment 1. In case of the embodiment 2, the image side surface of the second embodiment (I-2) is the aspheric surface manufactured by forming the image side surface ($\gamma_4$) of the thin transparent layer ($d_3'$) into the aspheric configuration. Here, the thin transparent layer ($d_3'$) is deposited on the spherical image side surface of the glass ($d_3$). The aspheric surface is expressed as follows:

$$X = \frac{Y^2}{\gamma_i + \gamma_i\sqrt{1 - \left(\frac{Y}{\gamma_i}\right)^2}} + BY^4 + CY^6 + DY^8 + \ldots$$

wherein:

X represents the coordinate along the optical axis measured from the top of the basic spherical surface;

Y represents the coordinate perpendicular to the optical axis measured from the optical axis (height from the optical axis);

$\gamma_i$ represents the radius of curvature of the basic spherical surface; and B, C, and D represent the aspheric surface coefficients, respectively.

TABLE 1

(Embodiment 1)
$f = 68.2 \sim 50.0 \sim 36.0$  FNO. = 4.1

| | Radius of Curvature | Axial Distance | Refractive Index (Nd) | Abbe Number ($\nu d$) |
|---|---|---|---|---|
| I | $\gamma_1^*$ 121.647 | | | |
| | | $d_1$ 2.000 | $N_1$ 1.74400 | $\nu_1$ 44.93 |
| | $\gamma_2$ 24.152 | | | |
| | | $d_2$ 7.000 | | |
| | $\gamma_3$ 28.562 | | | |
| | | $d_3$ 4.300 | $N_2$ 1.75520 | $\nu_2$ 27.51 |
| | $\gamma_4$ 44.012 | | | |
| | | $d_4$ 0.800~16.86~40.27 | | |
| | $\gamma_5$ 34.035 | | | |
| | | $d_5$ 3.000 | $N_3$ 1.67000 | $\nu_3$ 57.07 |
| | $\gamma_6$ −291.280 | | | |
| | | $d_6$ 0.150 | | |
| | $\gamma_7$ 22.420 | | | |
| | | $d_7$ 2.800 | $N_4$ 1.67000 | $\nu_4$ 57.07 |
| II | $\gamma_8$ 82.592 | | | |
| | | $d_8$ 3.899 | | |
| | $\gamma_9$ −118.156 | | | |
| | | $d_9$ 3.680 | $N_5$ 1.75000 | $\nu_5$ 25.14 |
| | $\gamma_{10}$ 18.081 | | | |
| | | $d_{10}$ 3.600 | | |
| | $\gamma_{11}$ 2547.965 | | | |

TABLE 1-continued (Embodiment 1)
$f = 68.2 \sim 50.0 \sim 36.0$  FNO. = 4.1

| Radius of Curvature | Axial Distance | Refractive Index (Nd) | Abbe Number ($\nu d$) |
|---|---|---|---|
| | $d_{11}$ 2.800 | $N_6$ 1.70055 | $\nu_6$ 30.11 |
| $\gamma_{12}$ −33.806 | | | |
| B = 0.35960602 × 10$^{-6}$ | | | |
| C = 0.41911782 × 10$^{-9}$ | | | |
| D = 0.8261163 × 10$^{-12}$ | | | |
| l = 93.28 | | | |

TABLE 2

(Embodiment 2)
$f = 68.2 \sim 50 \sim 36.0$  FN0. = 4.1

| | Radius of Curvature | Axial Distance | Refractive Index (Nd) | Abbe Number ($\nu d$) |
|---|---|---|---|---|
| | $\gamma_1$ 197.705 | | | |
| | | $d_1$ 2.000 | $N_1$ 1.74400 | $\nu_1$ 44.93 |
| | $\gamma_2$ 23.754 | | | |
| | | $d_2$ 5.700 | | |
| I | $\gamma_3$ 32.800 | | | |
| | | $d_3$ 4.300 | $N_2$ 1.71736 | $\nu_2$ 29.42 |
| | $\gamma_4'$ 86.956 | | | |
| | | $d_3'$ 0.150 | $N_3$ 1.52 | $\nu_3$ 51.06 |
| | $\gamma_4^*$ 70.502 | | | |
| | | $d_4$ 0.800~17.2~41.1 | | |
| | $\gamma_5$ 35.910 | | | |
| | | $d_5$ 3.000 | $N_4$ 1.67000 | $\nu_4$ 57.07 |
| | $\gamma_6$ −210.680 | | | |
| | | $d_6$ 0.150 | | |
| | $\gamma_7$ 23.426 | | | |
| | | $d_7$ 2.800 | $N_5$ 1.67000 | $\nu_5$ 57.07 |
| | $\gamma_8$ 88.401 | | | |
| II | | $d_8$ 4.191 | | |
| | $\gamma_9$ −109.921 | | | |
| | | $d_9$ 4.067 | $N_6$ 1.75000 | $\nu_6$ 25.14 |
| | $\gamma_{10}$ 18.693 | | | |
| | | $d_{10}$ 4.600 | | |
| | $\gamma_{11}$ 892.777 | | | |
| | | $d_{11}$ 2.800 | $N_7$ 1.67270 | $\nu_7$ 32.22 |
| | $\gamma_{12}$ −33.382 | | | |
| B = −0.32454086 × 10$^{-5}$ | | | |
| C = −0.16458645 × 10$^{-8}$ | | | |
| D = −0.12334671 × 10$^{-10}$ | | | |
| l = 94.0 | | | |

What is claimed is:

1. A zoom lens system of an inverted telephoto type comprising, from the object side to the image side;

a first lens group of a negative refractive power consisting of, from the object side to the image side, a first negative component, and a second positive component of a positive meniscus lens convex to the object side, at least one of the refractive surfaces in the first lens group being aspheric;

a second lens group of a positive refractive power with a variable air space formed between the first and second lens groups, consisting of from the object side to the image side, a third positive component, a fourth positive component, a fifth negative component, and a sixth positive component, the variable air space being varied during a zooming operation;

wherein the shortest focal length of the zoom lens system is less than the length of the diagonal line of the image plane; and wherein the zoom lens system fulfills the following conditions:

$2.3 fs < l < 2.75 fs$ $0.55 fs < \gamma_3 < 1.8 fs$ wherein:
l represents the axial distance from the object side surface of the first component to the image plane of the whole lens system in the longest focal length condition;
$\gamma_3$ represents the radius of curvature of the object side surface of the second component; and
fs represents the focal length of the whole lens system in the shortest focal length condition.

2. A zoom lens system as claimed in claim 1, wherein the object side surface of the first component is aspheric.

3. A zoom lens system as claimed in claim 1, wherein the image side surface of the second component is aspheric.

4. A zoom lens system as claimed in claim 1, wherein a component which has an aspheric surface includes a lens element having two spherical refractive surfaces and a thin transparent layer disposed on one of the refractive surfaces in the lens element, the thin transparent layer having an aspheric surface which faces to the air.

5. A zoom lens system as claimed in claim 4, wherein the lens element is different in dispersion from the thin transparent layer.

6. A zoom lens system as claimed in claim 1, wherein the zoom lens system further fulfills the following condition:

$$2.55 fs < l < 2.75 fs$$

$$0.75 fs < r_3 < 1.8 fs$$

7. A zoom lens system comprising the following design parameters:

| f = 68.2 ~ 50.0 ~ 36.0 | | Fno. = 4.1 | |
|---|---|---|---|
| Radius of Curvature | Axial Distance | Refractive Index (Nd) | Abbe Number (νd) |
| $\gamma 1$ 121.647 | | | |
| | $d_1$ 2.000 | $N_1$ 1.74400 | $\nu_1$ 44.93 |
| $\gamma 2$ 24.152 | | | |
| I | $d_2$ 7.000 | | |
| $\gamma 3$ 28.562 | | | |
| | $d_3$ 4.300 | $N_2$ 1.75520 | $\nu_2$ 27.51 |
| $\gamma 4$ 44.012 | | | |
| | $d_4$ 0.800 ~ 16.86 ~ 40.27 | | |
| $\gamma 5$ 34.035 | | | |
| | $d_5$ 3.000 | $N_3$ 1.67000 | $\nu_3$ 57.07 |
| $\gamma 6$ −291.280 | | | |
| | $d_6$ 0.150 | | |
| $\gamma 7$ 22.420 | | | |
| | $d_7$ 2.800 | $N_4$ 1.67000 | $\nu_4$ 57.07 |
| $\gamma 8$ 82.592 | | | |
| II | $d_8$ 3.899 | | |
| $\gamma 9$ −118.156 | | | |
| | $d_9$ 3.680 | $N_5$ 1.75000 | $\nu_5$ 25.14 |
| $\gamma 10$ 18.081 | | | |
| | $d_{10}$ 3.600 | | |
| $\gamma 11$ 2547.965 | | | |
| | $d_{11}$ 2.800 | $N_6$ 1.70055 | $\nu_6$ 30.11 |
| $\gamma 12$ −33.806 | | | |
| B = 0.35960602 × $10^{-6}$ | | | |
| C = 0.41911782 × $10^{-9}$ | | | |

-continued

| f = 68.2 ~ 50.0 ~ 36.0 | | Fno. = 4.1 | |
|---|---|---|---|
| Radius of Curvature | Axial Distance | Refractive Index (Nd) | Abbe Number (νd) |
| D = 0.8261163 × $10^{-12}$ | | | | wherein:
$\gamma_1^*$ is the aspheric surface expressed as follows:

$$X = \frac{Y^2}{\gamma_i + \gamma_i \sqrt{1 - \left(\frac{Y}{\gamma_i}\right)^2}} = BY^4 + CY^6 + DY^8$$

wherein:
X represents the coordinate along the optical axis measured from the top of the basic spherical surface;
Y represents the coordinate perpendicular to the optical axis measured from the optical axis (height from the optical axis);
$\gamma_i$ represents the radius of curvature of the basic spherical surface; and
B, C, and D represent the aspheric surface coefficients, respectively.

8. A zoom lens system of an inverted telephoto type comprising, from the object side to the image side:
a first lens group of a negative refractive power consisting of, from the object side to the image side, a first negative component, and a second positive component of a positive meniscus lens convex to the object side, at least one of the first and second components is a composite lens element of a high dispersion glass with a thin layer of a lower dispersion material to form an aspheric refractive surface;
a second lens group of a positive refractive power with a variable air space formed between the first and second lens groups, consisting of from the object side to the image side, a third positive component, a fourth positive component, a fifth negative component, and a sixth positive component, the variable air space being varied in a zooming operation;
wherein the shortest focal length of the zoom lens system is less than the length of the diagonal line of the image plane; and
wherein the zoom lens system fulfills the following conditions:

$$2.3 fs < l < 2.75 fs$$

$$0.55 fs < \gamma_3 < 1.8 fs$$

wherein:
l represents the axial distance from the object side surface of the first component to the image plane of the whole lens system in the longest focal length condition;
$\gamma_3$ represents the radius of curvature of the object side surface of the second component; and
fs represents the focal length of the whole lens system in the shortest focal length condition.

9. A zoom lens system as claimed in claim 8, wherein the zoom lens system fulfills the following conditions:

$$2.55 fs < l < 2.75 fs$$

$$0.75 fs < r_3 < 1.8 fs$$

* * * * *